US010135911B2

(12) United States Patent
Yasrebi et al.

(10) Patent No.: US 10,135,911 B2
(45) Date of Patent: Nov. 20, 2018

(54) APPARATUS AND METHOD FOR MULTIMEDIA COMMUNICATION

(71) Applicant: AT&T INTELLECTUAL PROPERTY I, LP, Atlanta, GA (US)

(72) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 29 days.

(21) Appl. No.: 14/749,150

(22) Filed: Jun. 24, 2015

(65) Prior Publication Data
US 2015/0295999 A1 Oct. 15, 2015

Related U.S. Application Data

(63) Continuation of application No. 13/943,377, filed on Jul. 16, 2013, now Pat. No. 9,094,474, which is a continuation of application No. 13/480,865, filed on May 25, 2012, now Pat. No. 8,504,658, which is a continuation of application No. 11/848,373, filed on Aug. 31, 2007, now Pat. No. 8,208,947.

(51) Int. Cl.
*H04L 29/08* (2006.01)
*H04L 29/06* (2006.01)

(52) U.S. Cl.
CPC .......... *H04L 67/10* (2013.01); *H04L 65/4084* (2013.01); *H04L 65/602* (2013.01); *H04L 67/06* (2013.01); *H04L 67/306* (2013.01); *H04L 67/32* (2013.01); *H04L 65/1016* (2013.01)

(58) Field of Classification Search
CPC ..... H04L 2209/60; H04L 51/14; H04L 51/18; H04L 63/126; H04L 51/24; H04L 65/607; H04L 67/42; G06F 17/30017; G06T 3/4092; H04N 21/2747; H04N 7/147; H04N 21/2187; H04N 21/2743; H04N 21/4334
See application file for complete search history.

(56) References Cited

U.S. PATENT DOCUMENTS

| | | | |
|---|---|---|---|
| 6,678,518 B2 | 1/2004 | Erola | |
| 2003/0054810 A1 | 3/2003 | Chen | |
| 2003/0110234 A1* | 6/2003 | Egli | ............. G06T 3/4092 709/217 |
| 2004/0045028 A1 | 3/2004 | Harris | |
| 2004/0117427 A1 | 6/2004 | Allen | |
| 2004/0117484 A1 | 6/2004 | Singer | |
| 2004/0203842 A1* | 10/2004 | Hanninen | ............. H04W 64/00 455/456.1 |

(Continued)

Primary Examiner — Charles Appiah
Assistant Examiner — Edward Zhang
(74) Attorney, Agent, or Firm — Guntin & Gust, PLC; Jay Anderson

(57) ABSTRACT

A process that incorporates teachings of the present disclosure may include, for example, recording, by a mobile communication, media content in a first media format and accessing a wireless media system by way of a wireless communication network. A request is transmitted to the remote media system to store the recorded media content in the first media format. The recorded media content is transmitted to the remote media system, without retaining a copy of the recorded media content in the first media format at the mobile communication device. Other embodiments are disclosed.

20 Claims, 6 Drawing Sheets

(56) References Cited

U.S. PATENT DOCUMENTS

| | | | |
|---|---|---|---|
| 2006/0072721 A1* | 4/2006 | Wisniewski | G06F 17/30905 379/88.22 |
| 2007/0027857 A1 | 2/2007 | Deng | |
| 2007/0050501 A1 | 3/2007 | Alston | |
| 2008/0178251 A1* | 7/2008 | Shin | G08B 13/19621 725/141 |
| 2008/0186385 A1* | 8/2008 | O | H04M 1/274525 348/207.99 |
| 2009/0325609 A1 | 12/2009 | Rosen | |

* cited by examiner

APPARATUS AND METHOD FOR MULTIMEDIA COMMUNICATION

CROSS-REFERENCE TO RELATED APPLICATIONS

This application is a continuation of and claims priority to U.S. patent application Ser. No. 13/943,377 filed Jul. 16, 2013, which is a continuation of and claims priority to U.S. patent application Ser. No. 13/480,865, filed May 25, 2012, issued as U.S. Pat. No. 8,504,658, which is a continuation of and claims priority to U.S. patent application Ser. No. 11/848,373 filed Aug. 31, 2007, issued as U.S. Pat. No. 8,208,947. The contents of each of the foregoing are hereby incorporated by reference into this application as if set forth herein in full.

FIELD OF THE DISCLOSURE

The present disclosure relates generally to communication services and more specifically to an apparatus and method for multimedia communication.

BACKGROUND

Sharing of multimedia content among communication devices, including wireless and mobile devices, can be done directly through transmitting the data therebetween. This can be a time-consuming and costly effort. Use of an intermediary, such as an electronic mailbox, can save time and effort but still requires the sender to make each of the recipients aware of the existence of the multimedia content. Additionally, not all of the recipients may be able to gain access to the electronic mailbox.

DETAILED DESCRIPTION

In one embodiment of the present disclosure, a computer-readable storage medium can have computer instructions for receiving a request to distribute media content from a communication device, receiving one or more targeted recipients of the media content, receiving a type of distribution associated with the one or more targeted recipients, receiving a recipient format for the media content associated with the one or more targeted recipients, receiving and storing the media content, adjusting a format of the media content according to the recipient format, and transmitting a notification associated with the media content to the one or more targeted recipients.

In one embodiment of the present disclosure, a server can have a controller to receive media content, receive a request for distribution of media content from a communication device, receive a desired format of each of a plurality of targeted recipients for the media content, and adjust a format of the media content based at least in part on the desired format.

In one embodiment of the present disclosure, a mobile communication device can have a controller to transmit to a media server a request for distribution of media content to one or more targeted recipients according to a user profile associated with the mobile communication device that is stored in the media server. A format of the media content can be adjusted by the media server based at least in part on the user profile.

In one embodiment of the present disclosure, a method can involve storing a user profile associated with a communication device, where the user profile can have at least one of one or more targeted recipients of media content, a type of distribution associated with the one or more targeted recipients, and a recipient format for the media content associated with the one or more targeted recipients. The method can involve receiving a request to distribute media content from a communication device, receiving the media content, and adjusting a format of the media content according to user profile.

Figure 1:
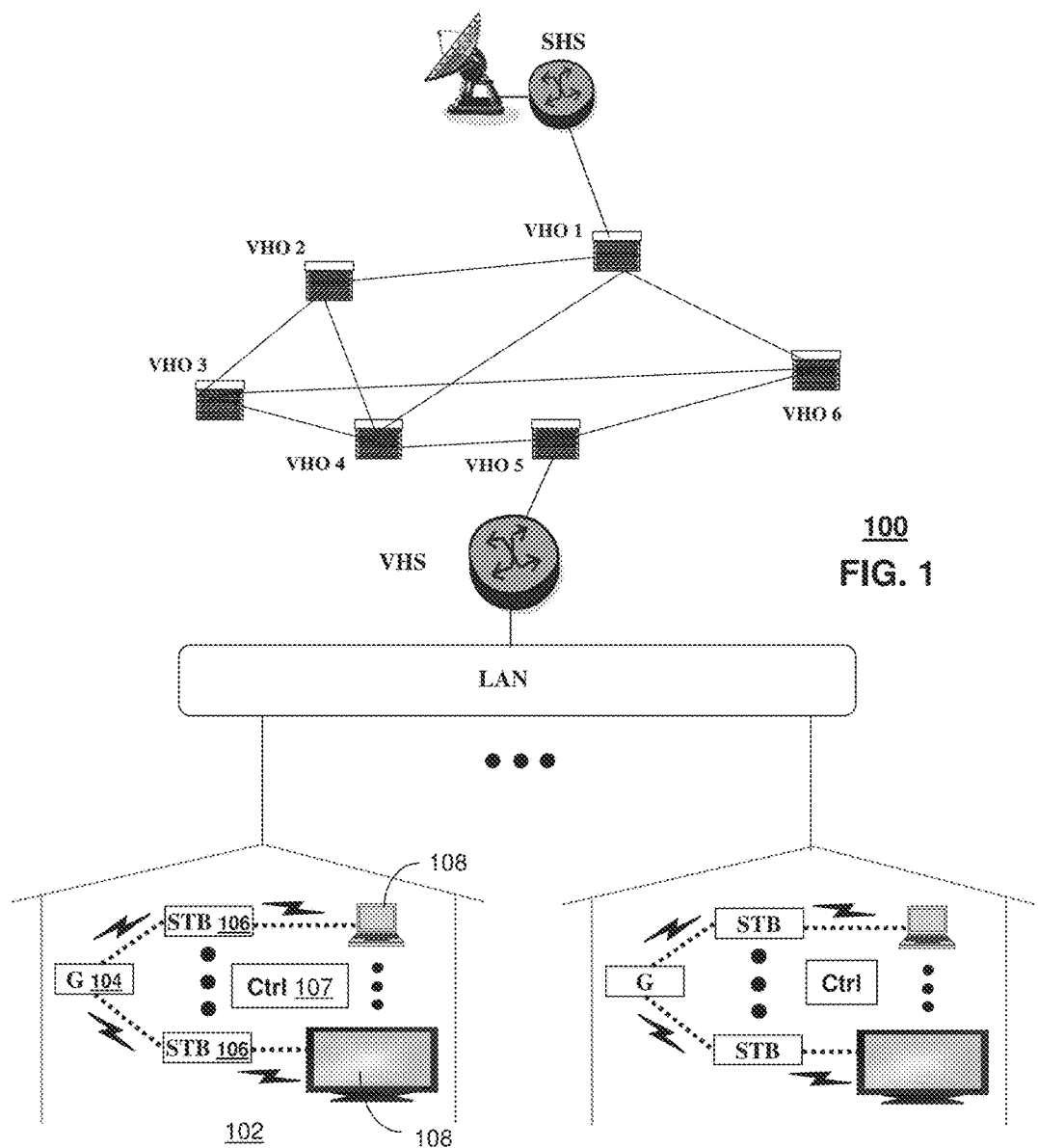
FIGS. 1-4 depict exemplary embodiments of communication systems.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
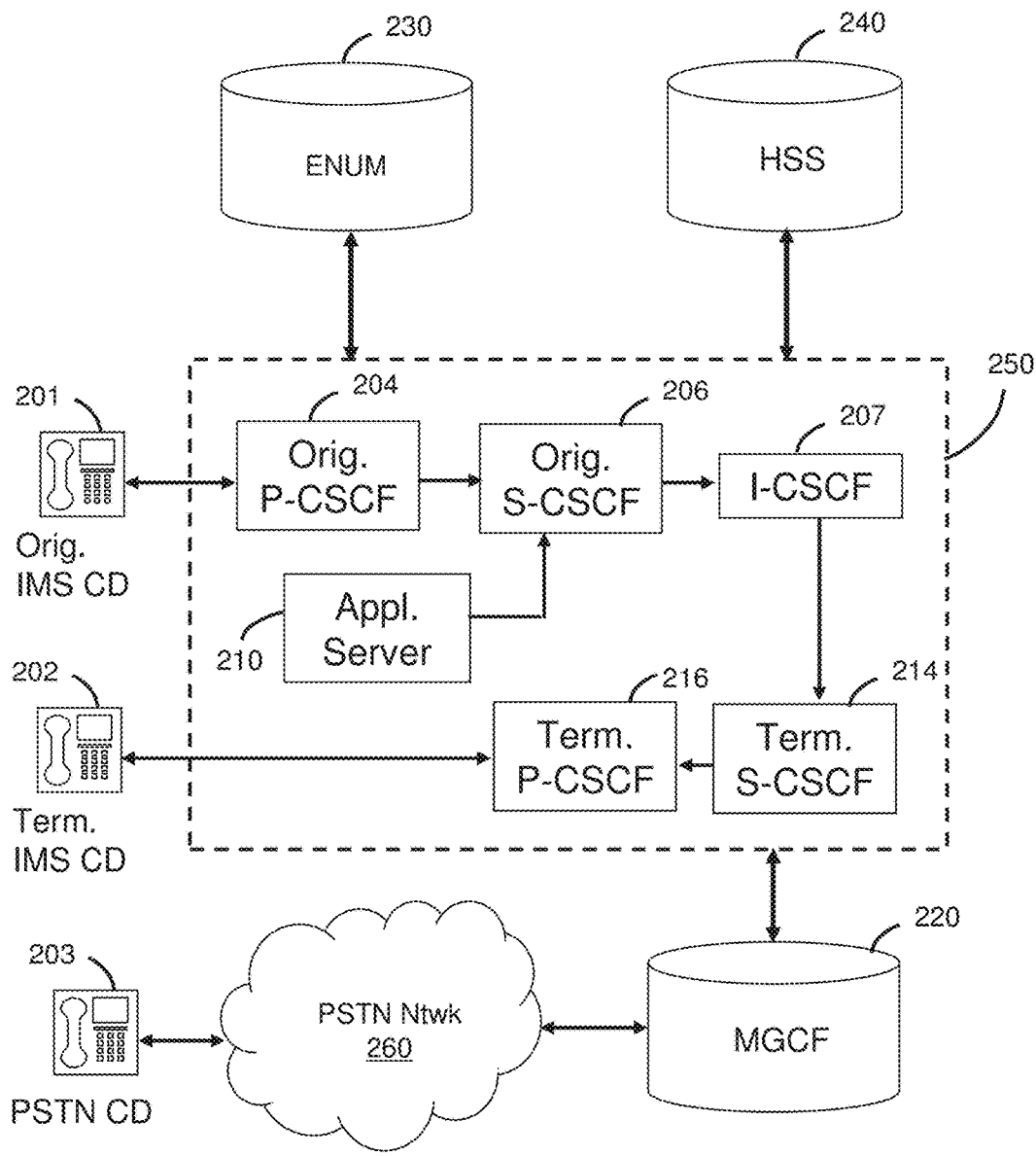

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 115 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful IP SIP address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
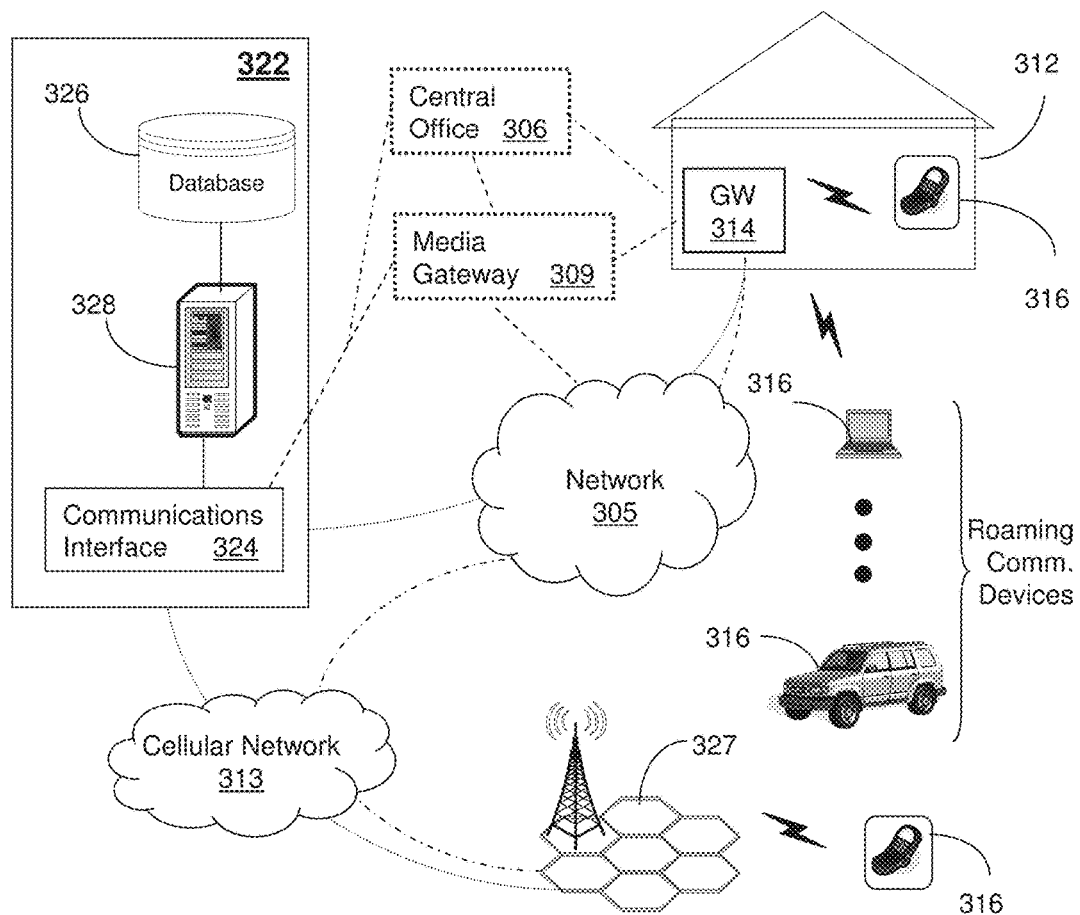

FIG. 3 depicts an exemplary embodiment of a communication system 300 employing fixed and/or mobile communication devices 316 communicating by way of wireless access points (WAPs) and/or wired infrastructure with other communication devices and/or a network proxy or web server 322, which collectively operate in the communication system 300. Communication system 300 can be overlaid or operably coupled with communication systems 100 and/or 200 as another representative embodiment of the communication system.

The communication device 316 can be a multimode communication device, such as a multimode VoIP terminal. However, the present disclosure also contemplates the use of other types of communication devices, including other types of voice, video and data devices. The communication system 300 can comprise a packet-switched network 305. The packet-switched network can be an Internet Service Provider (ISP) network 305. The network 305 can be coupled to the network proxy 322, the cellular network 313 and network elements located in one or more of the buildings 312 representing an enterprise or residence. The ISP network 305 utilizes technology for transporting Internet traffic.

In an enterprise setting, the building 312 can include a gateway 314 that provides voice and/or video connectivity services between communication devices 316, such as VoIP terminals or other forms of communication devices of enterprise personnel. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306 and the gateway 314. Communications between the network proxy 322, the communication devices 316 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 314. By way of the communications interface 324, the network proxy 322 can direct by common means any of the foregoing network elements to establish packet switched data, voice, and/or video connections between communication devices 316 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for communication devices 316, including VoIP terminals.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-1X, UMTS, WiMAX, software defined radio (SDR), and other known and future technologies. The cellular network 313 can be coupled to base stations 327 under a frequency-reuse plan for communicating over-the-air with roaming VoIP terminals 316.

Figure 4:
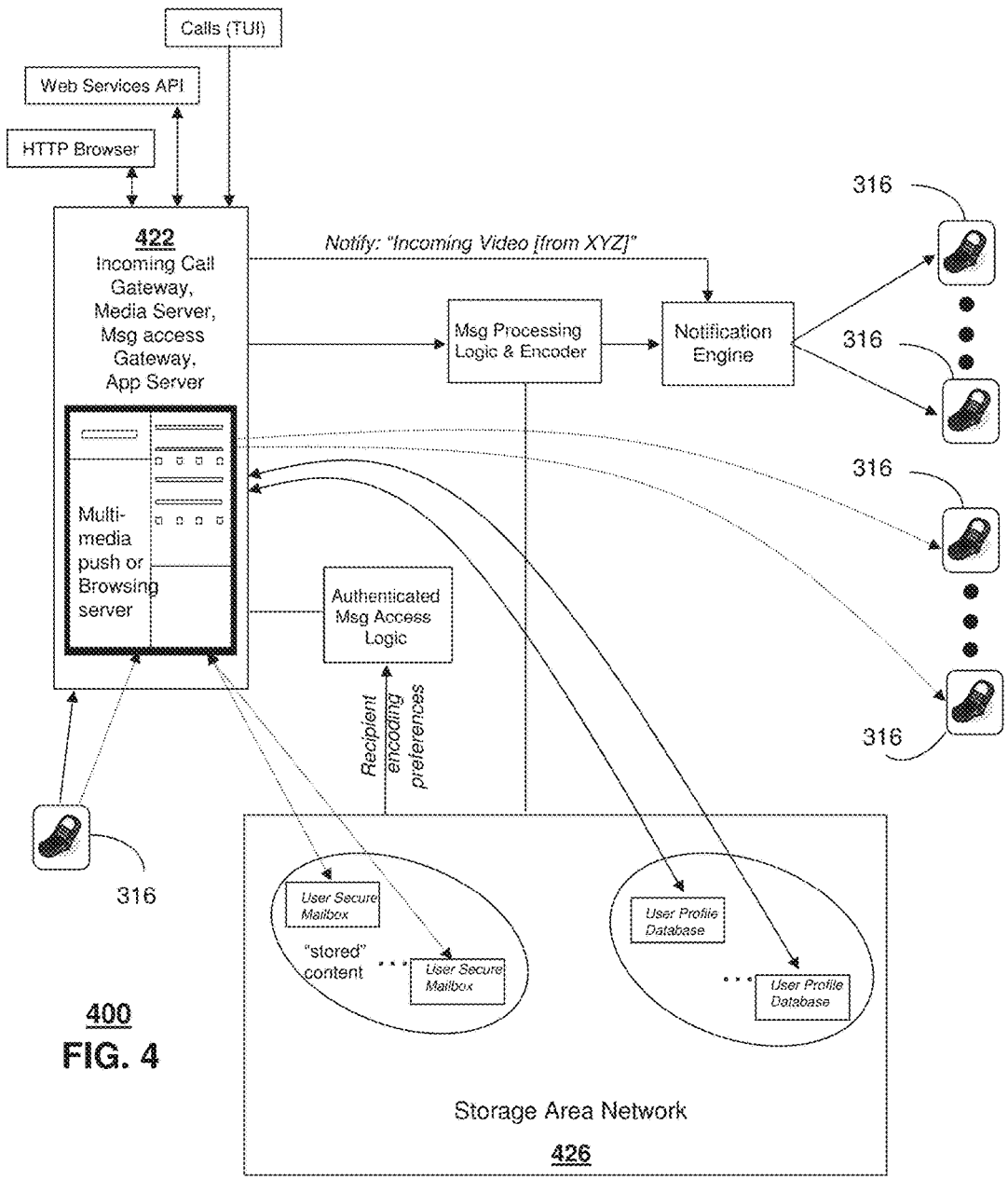

FIG. 4 depicts an exemplary embodiment of a communication system 400 employing fixed and/or mobile communication devices 316 communicating by way of wireless access points (WAPs) and/or wired infrastructure with other communication devices and/or a media server 422, which collectively operate in the communication system 400. Communication system 400 can be overlaid or operably coupled with communication systems 100, 200 and/or 300 as another representative embodiment of the communication system.

Media server 422 can include various components and can utilize various protocols to communicate with a storage area network 426, as well as to communicate with one or more other communication devices 316, such as for distributing multimedia content and transmitting notifications. The media server 422 can include components and technology for reformatting multimedia content, such as according to preferences of a targeted recipient. The storage area network 426 can include various components and can utilize various protocols to store data related to users of the communication system 400. For example, the storage area network 426 can include one or more user mailboxes, such as secure mailboxes, which can store various information including multimedia content. The storage area network 426 can also include one or more user profiles that can store various information including user preferences, targeted recipients, recipient preferences, and other information. Multimedia content can be delivered directly to the communication devices 316 from the media server 422 as represented by the dashed lines.

Figure 5:
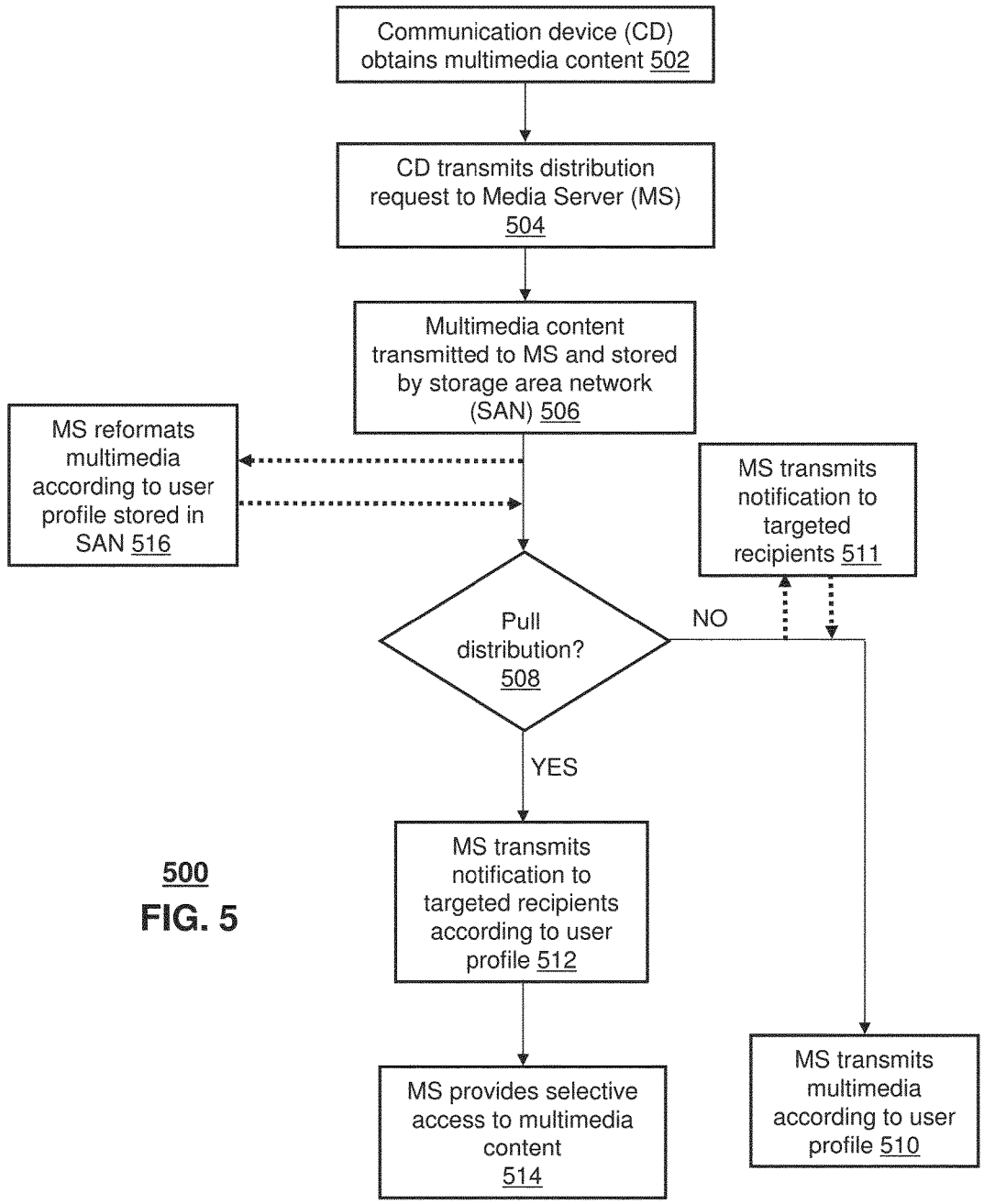
FIG. 5 depicts an exemplary method operating in portions of the communication systems.

FIG. 5 depicts an exemplary method 500 operating in portions of the communication systems 100-400. Method 500 has variants as depicted by the dashed lines. It would be apparent to an artisan with ordinary skill in the art that other embodiments not depicted in FIG. 5 are possible without departing from the scope of the claims described below. For convenience, the term communication system 100 as used in the following paragraphs can mean communication systems 100, 200, 300 and 400 singly or in combination, and the term communication device 316 can mean communication devices 201, 202, 203 and 316 singly or in combination.

Method 500 begins with step 502 in which the communication device 316 can obtain multimedia content that is to be stored and/or distributed to the communication devices of one or more targeted recipients. For example, the communication device 316 can include a video recorder for capturing moving images. Other media types are also contemplated by the present disclosure, such as still images, music, and video games, among others. The present disclosure also contemplates the communication device obtaining the multimedia content by other techniques, such as the content being forwarded from another communication device. The communication device 316 can also obtain the multimedia content from another device or network, such as by accessing a remote database. For example, the communication device 316 can browse multimedia content from a remote database and instruct that the multimedia content be forwarded to the user's mailbox without storing the content in the communication device.

In step 504, the communication device 316 can transmit a distribution request associated with the multimedia content to the media server 422. In one embodiment, the distribution request can be incorporated into the step of capturing the multimedia content, such as a function key on the communication device 316 that provides for both capturing video and distributing the video. In step 506, the multimedia content can be transmitted to the media server 422 where it is stored by the storage area network 426, such as in a secure user mailbox associated with the user's communication device 316. In one embodiment, the user can access his or her mailbox to view the multimedia content, as well as to view information associated with the multimedia content, such as size and format, as well as the status of delivery to or access by targeted recipients. The user can also specify one or more properties associated with the multimedia content, e.g., title, description, and so forth.

In step 508, the media server 422 can determine the distribution method to be used for the multimedia content. For example, the multimedia content can be provided to targeted recipients via pull distribution where a message or notification of the existence of the multimedia content is provided to targeted recipients. As another example of a pull distribution, the multimedia content can be transmitted to a mailbox of the targeted recipient for selective access by the targeted recipient, such as a secure user mailbox associated with each or any of targeted recipients in the storage area network 426. As yet another example, the multimedia content can be provided to the targeted recipients via push distribution where the content is transmitted directly to the communication device of the targeted recipient.

The type of distribution can be selected by the sender and/or the recipient associated with the communication device 316 and/or can be determined according to the user profile associated with the communication device 316, as stored in the storage area network 426. For example, the user profile can designate rules for multimedia content distribution according to push, pull or a combination of both. The designated distribution rules can be based upon the type of media content, the type or identity of the communication device (e.g., a user profile associated with multiple communication devices), the targeted recipients, and/or other factors. For example, a user profile can identify targeted recipients and designate that pull distribution is to be used for those targeted recipients using cellular phones while push distribution is to be used for those targeted recipients using desktop computers. As another example, the type of distribution can be selected by the user of the communication device 316, such as at the time of the distribution request as recited back in step 504.

The present disclosure also contemplates user profiles for the sender and the recipients of the multimedia content. User profiles can be associated with one or more of the sender and the recipients. In one embodiment, a selection of the type of distribution by the user of the communication device 316 can override any distribution designation provided in the user profile of the sender and/or the recipient. For example, a sender's selection of the type of distribution can override any distribution designation provided in the user profile of a recipient and/or a recipient's selection of the type of distribution can override any distribution designation provided in the user profile of a recipient. Rules can be established with respect to the priority of overriding, such as a sender's selection of a type of distribution can override a recipient's selection of the type of distribution.

If the multimedia content is not to be distributed via pull distribution then in step 510 the media server 422 can transmit the content to the communication devices of the targeted recipients. The targeted recipients can be designated in the user profile, which can be interrogated by the media server 422, such as upon receipt of multimedia content. The present disclosure also contemplates targeted recipients being designated through a selection made by the user of the communication device 316, such as in addition to or replacement of the targeted recipients designated in the user profile.

In one embodiment, a notification or message can be sent to the targeted recipients to advise that the multimedia content is going to be transmitted to the targeted recipients, as in step 511. For example, the push distribution notification can be forwarded to the targeted recipient a particular time period before the transmittal of the multimedia content to allow the targeted recipient to respond by authorizing the push distribution, requesting that the multimedia content not be transmitted, or to request a pull distribution.

If on the other hand, the multimedia content is to be transmitted via pull distribution then in step 512 a notification or message can be sent to the targeted recipients to advise of the existence of the content. The message can include a link to provide access to the multimedia content stored in the storage area network 426. The message can also include instructions on how to access the multimedia content. The type of message and means for transmitting the message can be designated in the user profile, such as a message via email, page and/or web services. In step 514, upon proper authentication the media server 422 can allow each of the targeted recipients to gain access to the multimedia content.

In one embodiment, the media server 422 can reformat the multimedia content according to preferences or a desired format stored in the user profile that are associated with the communication devices of the targeted recipients (e.g., a recipient format), as in step 516. For example, a user profile can designate a file format to be used for particular communication devices of the targeted recipients that may only have software that is capable of reading that particular file format. As another example, a user profile can designate targeted recipients that are to receive images of a particular resolution in order to reduce the size of the multimedia content file and facilitate access for the communication device. The degree of reformatting of the multimedia content by the media server 422 can vary from merely adjusting a color contrast or other property of an image (e.g., a resolution) to re-encoding the file for use by a particular communication device. The media server 422 can store each of the reformatted files in the storage area network 426.

Upon reviewing the aforementioned embodiments, it would be evident to an artisan with ordinary skill in the art that said embodiments can be modified, reduced, or enhanced without departing from the scope and spirit of the claims described below. For example, other information can be provided by the distributor of the multimedia content, such as the title or summary of the content or its urgency. The targeted recipients and the types of distribution can be varied. For example, the user profile can have a number of entries for various targeted recipients and various types of distribution associated with those targeted recipients. The user can select a particular entry through use of his or her communication device, such as at the time of requesting distribution. The entries can also be modified at anytime to provide further flexibility and efficiency to the distribution of the multimedia content to the group of targeted recipients. The media server 422 can also vary the type of pull distribution, such as providing hyperlinks to the multimedia content on the targeted recipient's web page and/or on the user's web page. As another example, the media server can provide various modes of push distribution, such as an immediate delivery to all targeted recipients or a batch delivery to groups of the targeted recipients.

These are but a few examples of modifications that can be applied to the present disclosure without departing from the scope of the claims. Accordingly, the reader is directed to the claims section for a fuller understanding of the breadth and scope of the present disclosure.

Figure 6:
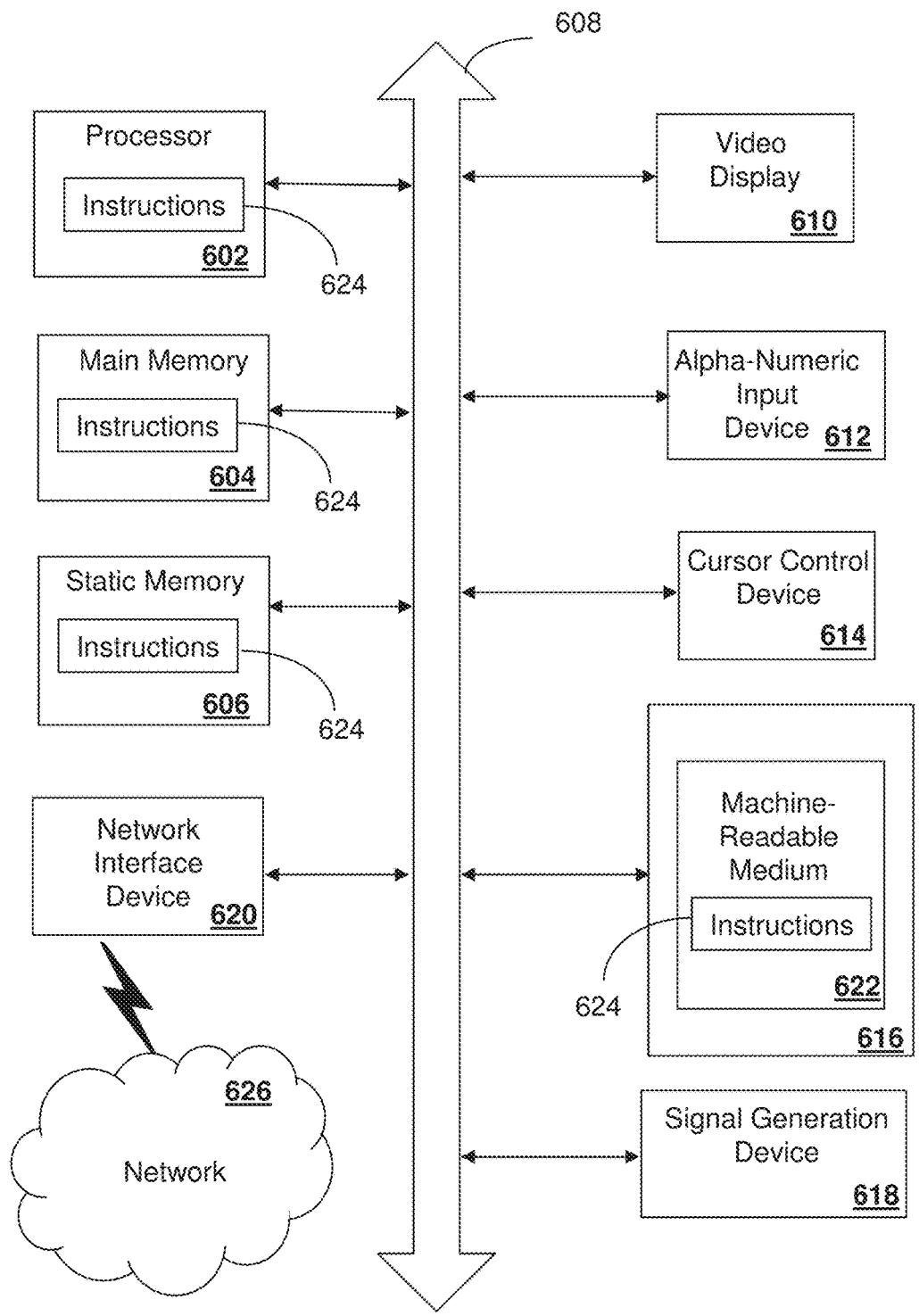
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a mass storage medium 616, a signal generation device 618 (e.g., a speaker or remote control) and a network interface device 620.

The mass storage medium 616 may include a computer-readable storage medium 622 on which is stored one or more sets of instructions (e.g., software 624) embodying any one or more of the methodologies or functions described herein, including those methods illustrated above. The computer-readable storage medium 622 can be an electromechanical medium such as a common disk drive, or a mass storage medium with no moving parts such as Flash or like non-volatile memories. The instructions 624 may also reside, completely or at least partially, within the main memory 604, the static memory 606, and/or within the processor 602 during execution thereof by the computer system 600. The main memory 604 and the processor 602 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the computer-readable storage medium 622 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
capturing, by a wireless communication device having a processing system including a processor, media content to generate captured media content in a first media format;
accessing, by the wireless communication device, a media system by way of a wireless communication network;
determining, responsive to the capturing of the media content, a designation of a recipient of the captured media content based on a user profile associated with the wireless communication device;
transmitting, by the wireless communication device, a request to the media system to store the captured media content for distribution;
transmitting, by the wireless communication device, a distribution request to the media system responsive to the capturing of the media content, wherein the distribution request includes the designation of the recipient of the captured media content; and
transmitting, by the wireless communication device, the media content to the media system by way of the wireless communication network, without retaining a copy of the media content at the wireless communication device, wherein the recipient receives a notification of an availability of the media content responsive to the transmitting of the distribution request, and wherein access to the media content by equipment of the recipient is based on the designation of the recipient.

2. The method of claim 1, wherein the capturing of the media content comprises obtaining, by the wireless communication device, the media content from another communication device.

3. The method of claim 1, wherein the captured media content in the first media format comprises video content, wherein selection of a function key of the wireless communication device to initiate a capturing of the media content, facilitates the transmitting of the distribution request.

4. The method of claim 3, further comprising:
determining whether the recipient is associated with a push distribution or a pull distribution to obtain a determination, wherein the distribution request includes a designation of a push distribution or a pull distribution based on the determination, and wherein the wireless communication device comprises cellular phone.

5. The method of claim 4, further comprising:
accessing, by the wireless communication device, the media content in a second media format to generate media content in a second media format, wherein the user profile identifies the second media format; and
storing, by the wireless communication device, a copy of the captured media content in the second media format to generate a retained copy of the captured media content.

6. The method of claim 5, wherein the first media format comprises a first resolution and the second media format comprises a second resolution to reduce a size of the retained copy of the media content relative to the media content in the first media format.

7. The method of claim 3, wherein the captured media content in the first media format is distributed by the media system.

8. The method of claim 7, wherein one of the transmitting of the media content to the media system, a distributing of the captured media content by the media system or both is based on a user profile.

9. A mobile communication device, comprising:
a processing system including a processor; and
a memory that stores executable instructions that, when executed by the processing system, facilitate performance of operations, comprising:
capturing media content to generate captured media content in a first media format;
determining, responsive to the capturing of the media content, a designation of a recipient based on a user profile associated with the mobile communication device;
accessing a remote media system accessible by way of a wireless communication network;
forwarding a request to the remote media system to store the captured media content in the first media format, to obtain stored media content in the first media format, based on a user preference of a user profile associated with the mobile communication device;
forwarding a distribution request to the remote media system responsive to the capturing of the media content, wherein the distribution request includes the designation of the recipient; and
forwarding the captured media content in the first media format to the remote media system for storage in the first media format, without retaining a copy of the captured media content, wherein the recipient receives a notification of an availability of the stored media content, responsive to the forwarding of the distribution request, and wherein access to the stored media content by equipment of the recipient is based on the designation of the recipient.

10. The mobile communication device of claim 9, wherein the captured media content comprises video content, and wherein the wireless communications network comprises a cellular communications network.

11. The mobile communication device of claim 9, wherein the capturing of the media content in the first media format comprises accessing, by the mobile communication device, the media content from another mobile communication device.

12. The mobile communication device of claim 9, wherein the capturing of the media content comprises capturing, by the mobile communication device, video content.

13. The mobile communication device of claim 12, wherein the mobile communication device comprises cellular phone.

14. The mobile communication device of claim 13, wherein the operations further comprise storing, by the mobile communication device, a local copy the media content according to a second media format to obtain locally stored media content.

15. The mobile communication device of claim 14, wherein the first media format comprises a first resolution and the second media format comprises a second resolution to reduce a size of the locally stored media content in comparison to the stored media content in the first media format.

16. A non-transitory machine-readable storage medium comprising instructions, which when executed by a processing system including a processor, facilitate perform operations comprising:
capturing media content at a mobile communication device to generate captured media content in a first media format;
determining, responsive to the capturing of the media content, an identification of a recipient based on a user profile associated with the mobile communication device;
accessing a remote media system;
forwarding a distribution request to the remote media system responsive to the capturing of the media content;
forwarding a request to the remote media system to store the captured media content in the first media format to obtain stored media content in the first media format, wherein the request includes the identification of the recipient; and
forwarding the captured media content in the first media format to the remote media system, without retaining a copy of the captured media content in the first media format at the mobile communication device, wherein the recipient receives a notification of an availability of the stored media content in the first media format, responsive to the forwarding of the distribution request, and wherein access to the captured media content by equipment of the recipient is based on the identification of the recipient.

17. The non-transitory machine-readable storage medium of claim 16, wherein the media content comprises video content.

18. The non-transitory machine-readable storage medium of claim 16, wherein the capturing of the media content comprises recording video content.

19. The non-transitory machine-readable storage medium of claim 18, the mobile communication device comprises cellular phone.

20. The non-transitory machine-readable storage medium of claim 19, wherein the operations further comprise locally storing, by the mobile communication device, the media content according to a second media format to obtain locally stored media content.

* * * * *

UNITED STATES PATENT AND TRADEMARK OFFICE
CERTIFICATE OF CORRECTION

| | | |
|---|---|---|
| PATENT NO. | : 10,135,911 B2 | Page 1 of 5 |
| APPLICATION NO. | : 14/749150 | |
| DATED | : November 20, 2018 | |
| INVENTOR(S) | : Mehrad Yasrebi and James Jackson | |

It is certified that error appears in the above-identified patent and that said Letters Patent is hereby corrected as shown below:

In Claim 1, Column 10, Lines 30-58, delete:
"1. A method, comprising:
capturing, by a wireless communication device having a processing system including a processor, media content to generate captured media content in a first media format;
accessing, by the wireless communication device, a media system by way of a wireless communication network;
determining, responsive to the capturing of the media content, a designation of a recipient of the captured media content based on a user profile associated with the wireless communication device;
transmitting, by the wireless communication device, a request to the media system to store the captured media content for distribution;
transmitting, by the wireless communication device, a distribution request to the media system responsive to the capturing of the media content, wherein the distribution request includes the designation of the recipient of the captured media content;
and transmitting, by the wireless communication device, the media content to the media system by way of the wireless communication network, without retaining a copy of the media content at the wireless communication device, wherein the recipient receives a notification of an availability of the media content responsive to the transmitting of the distribution request, and wherein access to the media content by equipment of the recipient is based on the designation of the recipient."

And insert:
--1. A method, comprising:
  capturing, by a processing system including a processor of a wireless communication device, media content to generate captured media content in a first media format;
  accessing, by the processing system, a media system by way of a wireless communication network;
  determining, by the processing system responsive to the capturing of the media content, a designation of a recipient of the captured media content based on a user profile associated with the wireless communication device;
  transmitting, by the processing system, a request to the media system to store the captured media content for distribution; transmitting, by the processing system, a distribution request to the Signed and Sealed this
Eighteenth Day of June, 2019

Andrei Iancu
*Director of the United States Patent and Trademark Office* media system responsive to the capturing of the media content, wherein the distribution request includes the designation of the recipient of the captured media content, and wherein the distribution request includes a designation of a push distribution or a pull distribution; and transmitting, by the processing system, the media content to the media system by way of the wireless communication network, without subsequently retaining a stored copy of the media content at the wireless communication device in the first media format, wherein the recipient receives a notification of an availability of the media content responsive to the transmitting of the distribution request, and wherein access to the media content by equipment of the recipient is based on the designation of the recipient.--

In Claim 2, Column 10, Lines 59-62, delete:
"2. The method of claim 1, wherein the capturing of the media content comprises obtaining, by the wireless communication device, the media content from another communication device."

And insert:
--2. The method of claim 1, wherein the capturing of the media content comprises obtaining, by the processing system, the media content from another communication device.--

In Claim 4, Column 11, Lines 1-8, delete:
"4. The method of claim 3, further comprising: determining whether the recipient is associated with a push distribution or a pull distribution to obtain a determination, wherein the distribution request includes a designation of a push distribution or a pull distribution based on the determination, and wherein the wireless communication device comprises cellular phone."

And insert:
--4. The method of claim 3, further comprising:
determining, by the processing system, whether the recipient is associated with a push distribution or a pull distribution, and wherein the wireless communication device comprises a cellular phone.--

In Claim 5, Column 11, Lines 9-17, delete:
"5. The method of claim 4, further comprising: accessing, by the wireless communication device, the media content in a second media format to generate media content in a second media format, wherein the user profile identifies the second media format; and storing, by the wireless communication device, a copy of the captured media content in the second media format to generate a retained copy of the captured media content."

And insert:
--5. The method of claim 4, further comprising:
  accessing, by the processing system, the media content in a second media format to generate media content in a second media format, wherein the user profile identifies the second media format; and
  storing, by the processing system, a copy of the captured media content in the second media format to generate a retained copy of the captured media content.--

CERTIFICATE OF CORRECTION (continued)
U.S. Pat. No. 10,135,911 B2

In Claim 9, Column 11, Lines 30-61, delete:
"9. A mobile communication device, comprising: a processing system including a processor; and a memory that stores executable instructions that, when executed by the processing system, facilitate performance of operations, comprising:
capturing media content to generate captured media content in a first media format; determining, responsive to the capturing of the media content, a designation of a recipient based on a user profile associated with the mobile communication device;
accessing a remote media system accessible by way of a wireless communication network; forwarding a request to the remote media system to store the captured media content in the first media format, to obtain stored media content in the first media format, based on a user preference of a user profile associated with the mobile communication device; forwarding a distribution request to the remote media system responsive to the capturing of the media content, wherein the distribution request includes the designation of the recipient; and forwarding the captured media content in the first media format to the remote media system for storage in the first media format, without retaining a copy of the captured media content, wherein the recipient receives a notification of an availability of the stored media content, responsive to the forwarding of the distribution request, and wherein access to the stored media content by equipment of the recipient is based on the designation of the recipient."

And insert:
--9. A mobile communication device, comprising:
    a processing system including a processor; and
    a memory that stores executable instructions that, when executed by the processing system, facilitate performance of operations, comprising:
        capturing media content to generate captured media content in a first media format;
        determining, responsive to the capturing of the media content, a designation of a recipient based on a user profile associated with the mobile communication device;
        accessing a remote media system accessible by way of a wireless communication network;
        forwarding a request to the remote media system to store the captured media content in the first media format, to obtain stored media content in the first media format, based on a user preference of a user profile associated with the mobile communication device;
        forwarding a distribution request to the remote media system responsive to the capturing of the media content, wherein the distribution request includes the designation of the recipient, and wherein the distribution request includes a designation of a push distribution or a pull distribution; and
        forwarding the captured media content in the first media format to the remote media system for storage in the first media format, without subsequently retaining a stored copy of the captured media content in the first media format, wherein the recipient receives a notification of an availability of the stored media content, responsive to the forwarding of the distribution request, and wherein access to the stored media content by equipment of the recipient is based on the designation of the recipient.--

In Claim 11, Column 11, Line 66, to Column 12, Line 3, delete:
"11. The mobile communication device of claim 9, wherein the capturing of the media content in the first media format comprises accessing, by the mobile communication device, the media content from another mobile communication device."

CERTIFICATE OF CORRECTION (continued)
U.S. Pat. No. 10,135,911 B2

And insert:
--11. The mobile communication device of claim 9, wherein the capturing of the media content in the first media format comprises accessing the media content from another mobile communication device.--

In Claim 12, Column 12, Lines 4-6, delete:
"12. The mobile communication device of claim 9, wherein the capturing of the media content comprises capturing, by the mobile communication device, video content."

And insert:
--12. The mobile communication device of claim 9, wherein the capturing of the media content comprises capturing video content.--

In Claim 13, Column 12, Lines 7-9, delete:
"13. The mobile communication device of claim 12, wherein the mobile communication device comprises cellular phone."

And insert:
--13. The mobile communication device of claim 12, wherein the mobile communication device comprises a cellular phone.--

In Claim 14, Column 12, Lines 11-15, delete:
"14. The mobile communication device of claim 13, wherein the operations further comprise storing, by the mobile communication device, a local copy the media content according to a second media format to obtain locally stored media content."

And insert:
--14. The mobile communication device of claim 13, wherein the operations further comprise storing a local copy of the media content according to a second media format to obtain locally stored media content.--

In Claim 16, Column 12, Lines 22-52, delete:
"16. A non-transitory machine-readable storage medium comprising instructions, which when executed by a processing system including a processor, facilitate perform operations comprising: capturing media content at a mobile communication device to generate captured media content in a first media format; determining, responsive to the capturing of the media content, an identification of a recipient based on a user profile associated with the mobile communication device; accessing a remote media system; forwarding a distribution request to the remote media system responsive to the capturing of the media content; forwarding a request to the remote media system to store the captured media content in the first media format to obtain stored media content in the first media format, wherein the request includes the identification of the recipient; and forwarding the captured media content in the first media format to the remote media system, without retaining a copy of the captured media content in the first media format at the mobile communication device, wherein the recipient receives a notification of an availability of the stored media content in the first media format, responsive to the forwarding of the distribution request, and wherein access to the captured media content by equipment of the recipient is based on the identification of the recipient."

CERTIFICATE OF CORRECTION (continued)
U.S. Pat. No. 10,135,911 B2

And insert:
-- 16. A non-transitory machine-readable storage medium comprising executable instructions, which when executed by a processing system including a processor, facilitate performance of operations comprising:

capturing media content at a mobile communication device to generate captured media content in a first media format;

determining, responsive to the capturing of the media content, an identification of a recipient based on a user profile associated with the mobile communication device;

accessing a remote media system;

forwarding a distribution request to the remote media system responsive to the capturing of the media content, wherein the distribution request includes a designation of a push distribution or a pull distribution;

forwarding a request to the remote media system to store the captured media content in the first media format to obtain stored media content in the first media format, wherein the request includes the identification of the recipient; and forwarding the captured media content in the first media format to the remote media system, without subsequently retaining a stored copy of the captured media content in the first media format at the mobile communication device, wherein the recipient receives a notification of an availability of the stored media content in the first media format, responsive to the forwarding of the distribution request, and wherein access to the captured media content by equipment of the recipient is based on the identification of the recipient.--

In Claim 19, Column 12, Lines 59-61, delete:
"19. The non-transitory machine-readable storage medium of claim 18, the mobile communication device comprises cellular phone."

And insert:
--19. The non-transitory machine-readable storage medium of claim 18, the mobile communication device comprises a cellular phone.--

In Claim 20, Column 12, Lines 62-66, delete:
"20. The non-transitory machine-readable storage medium of claim 19, wherein the operations further comprise locally storing, by the mobile communication device, the media content according to a second media format to obtain locally stored media content."

And insert:
--20. The non-transitory machine-readable storage medium of claim 19, wherein the operations further comprise locally storing the media content according to a second media format to obtain locally stored media content.--